United States Patent
Rodriguez et al.

(10) Patent No.: US 9,189,537 B2
(45) Date of Patent: Nov. 17, 2015

(54) EXTRACTION OF CRITICAL INFORMATION FROM DATABASE

(75) Inventors: Jesus M. Rodriguez, Wake Forest, NC (US); Kevin A. Smith, Raleigh, NC (US); John W. Matthews, Wake Forest, NC (US)

(73) Assignee: Red Hat, Inc., Raleigh, NC (US)

(*) Notice: Subject to any disclaimer, the term of this patent is extended or adjusted under 35 U.S.C. 154(b) by 766 days.

(21) Appl. No.: 12/201,416

(22) Filed: Aug. 29, 2008

(65) Prior Publication Data

US 2010/0057711 A1    Mar. 4, 2010

(51) Int. Cl.
  *G06F 17/00* (2006.01)
  *G06F 17/30* (2006.01)

(52) U.S. Cl.
  CPC .................. *G06F 17/30613* (2013.01)

(58) Field of Classification Search
  None
  See application file for complete search history.

(56) References Cited

U.S. PATENT DOCUMENTS

| | | | |
|---|---|---|---|
| 7,136,851 B2* | 11/2006 | Ma et al. | 707/770 |
| 2002/0174110 A1* | 11/2002 | Smith | 707/3 |
| 2005/0177554 A1* | 8/2005 | Peltonen et al. | 707/3 |
| 2006/0074980 A1* | 4/2006 | Sarkar | 707/104.1 |
| 2007/0074125 A1* | 3/2007 | Platt et al. | 715/760 |
| 2008/0281794 A1* | 11/2008 | Mathur | 707/3 |
| 2008/0281857 A1* | 11/2008 | Dymetman | 707/102 |

OTHER PUBLICATIONS

Battelle, John, "An Open Source Search Engine," Sep. 11, 2003, accessed at: http://searchenginewatch.com/showPage.html?page=sew_print&id=3071971, 2 pages.
Wikipedia, "Nutch," acessed at: http://en.wikipedia.org/wiki/Nutch, accessed on Aug. 13, 2008, 2 pages.

* cited by examiner

*Primary Examiner* — Hosain Alam
*Assistant Examiner* — Tuan-Khanh Phan
(74) *Attorney, Agent, or Firm* — Lowenstein Sandler LLP

(57) ABSTRACT

Some embodiments of extraction of critical information from a database in a networked system have been presented. In one embodiment, a subset of data from the database in the networked system is extracted. The subset of data is indexed to generate an index. Using the index, a preview of the subset of data may be provided to users in response to a user request without accessing the database.

17 Claims, 5 Drawing Sheets

US 9,189,537 B2

EXTRACTION OF CRITICAL INFORMATION FROM DATABASE

TECHNICAL FIELD

Embodiments of the present invention relate to handling of critical information, and more specifically to extracting and indexing critical information from a database in a networked environment.

BACKGROUND

Conventionally, a software vendor may deploy a conventional server to a customer's internal network to manage and to maintain software licensed to the customer. Typically, the conventional server may store some information in a database within the customer's internal network. Some examples of the information include provisioning profiles, metadata of operating systems, software documentation, etc. Users may search for some information of interest from the database via the conventional server. For example, a user looking for the instruction manual of virtual host provisioning may input a request for documents related to virtual host provisioning to the conventional server. In response to the user request, the conventional server queries the database to search for documents related to virtual host provisioning. Because the conventional server has to access the database, which is external to the conventional server, it typically takes a long time for the conventional server to obtain the search result from the database.

BRIEF DESCRIPTION OF THE DRAWINGS

The present invention is illustrated by way of example, and not by way of limitation, in the figures of the accompanying drawings and in which.

DETAILED DESCRIPTION

Figure 1A:
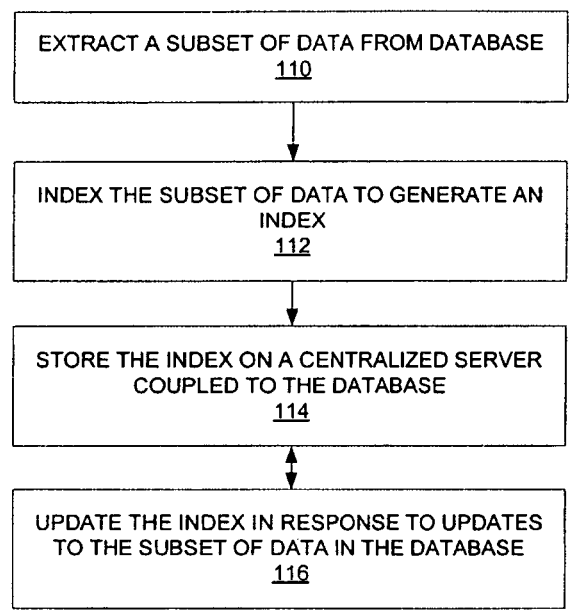
FIG. 1A illustrates one embodiment of a method to extract and index data from a database.

Described herein are some embodiments of extraction of critical information from a database in a networked system. In one embodiment, a subset of data from the database in the networked system is extracted. The subset of data is indexed to generate an index. Using the index, a preview of the subset of data may be provided to users in response to a user request without accessing the database. Furthermore, in response to a user search request, the index may be searched first for matching data, instead of searching the database first.

In some embodiments, the search and indexing are performed using a keyword-based search engine to allow for expanded searching capabilities and greater searching speed. One example of the search engine is Nutch provided by Apache Software Foundation. Other search engines may be used in different embodiments. Furthermore, a substantially continuous automated process may be set up to keep the index updated with data in the database.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, flash memory, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A illustrates one embodiment of a method to extract and index data from a database. The method may be performed by processing logic that may comprise hardware (e.g., circuitry, dedicated logic, programmable logic, microcode, etc.), software (such as instructions run on a processing device), firmware, or a combination thereof. For example, the data extractor 250 and the search engine 215 of the centralized server 200 shown in FIG. 2 may perform at least part of the method.

Initially, processing logic in a centralized server extracts a subset of data from a database coupled to the centralized server in a networked system of a customer of a software vendor (processing block 110). Details of one embodiment of the centralized server and one embodiment of the networked system are discussed below with reference to FIGS. 2 and 3, respectively. In some embodiments, the subset of data includes information critical to the networked system and/or information frequently accessed by users in the networked system. For example, the subset of data may include documents (e.g., user manuals), metadata of an operating system, provisioning profiles, etc. Then processing logic indexes the subset of data to generate an index (processing block 112). For example, processing logic may crawl the documents in the subset of data to find links (a.k.a. hyperlinks) in the documents and to generate a list of these links. Then processing logic may index the list of links. In some embodiments, processing logic indexes the subset of data by keywords. In addition to, or in alternative to, indexing by keywords, processing logic may index the subset of data by user information (e.g., user names, user identifications, user email addresses, etc.). Note that processing logic may index the subset of data by other information or combination of information in different embodiments.

In some embodiments, processing logic stores the index generated on the centralized server (processing block 114). As such, the centralized server may rely on the index in order to provide a preview or other information of the subset of data without further accessing the database. In some embodiments, processing logic may update the index in response to updates made to the subset of data in the database (processing block 116). Alternatively, processing logic may periodically check the database for updates to the subset of data. If processing logic finds updates to the subset of data, processing logic may extract the updated data in order to update the index.

Figure 1B:
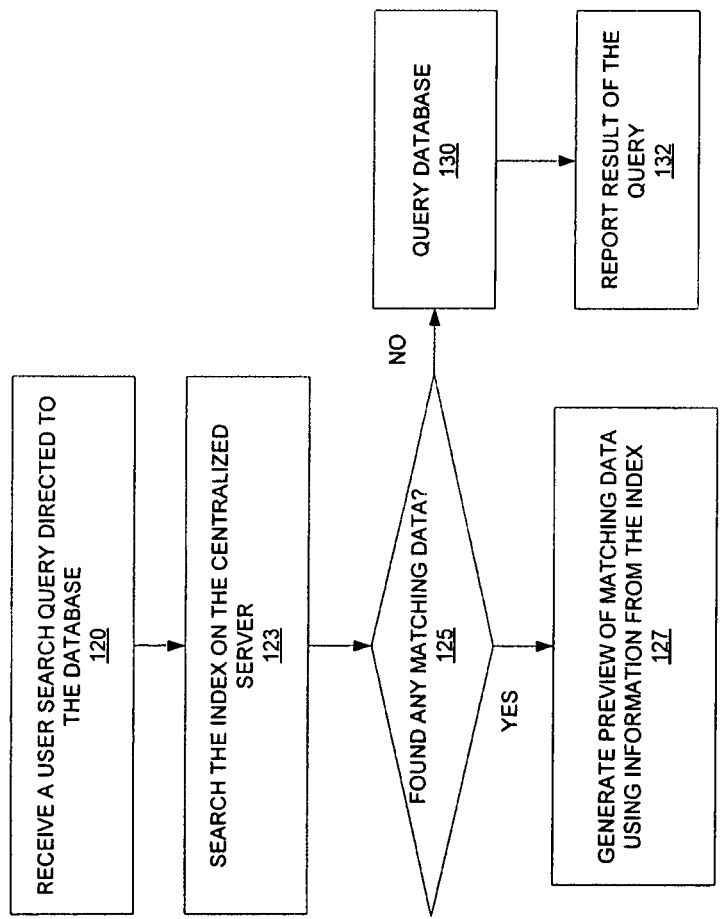
FIG. 1B illustrates one embodiment of a method to process a user search query.

FIG. 1B illustrates one embodiment of a method to process a user search query. The method may be performed by processing logic that may comprise hardware (e.g., circuitry, dedicated logic, programmable logic, microcode, etc.), software (such as instructions run on a processing device), firmware, or a combination thereof. For example, the search engine 215 of the centralized server 200 shown in FIG. 2 may perform at least part of the method.

Initially, processing logic receives a user search query directed to the database (processing block 120). In some embodiments, the search query may be in a format or language recognizable by the database, such as Sequential Query Language (SQL). Alternatively, the search query may simply be one or more keywords entered via a graphical user interface (GUI), such as a user name, "John Doe." Then processing logic searches the index on the centralized server to find matching data in response to the user search query (processing block 123). One embodiment of a method to generate the index has been discussed above. Then processing logic determines if any matching data is found in the index (processing block 125). If some matching data is found in the index, then processing logic generates a preview of the matching data using information from the index (processing block 127). Note that processing logic does not have to further access the database in order to generate the preview because the information needed is already in the index on the centralized server. As a result, the response time to the user search query may be faster because processing logic does not have to access the database in this scenario.

Otherwise, if no matching data is found in the index, processing logic queries the database to determine if there is any matching data in the database (processing block 130). In some embodiments where the user search query is already in SQL, processing logic may simply forward the user search query to the database. Otherwise, if the user search query is in other formats not recognizable by the database (e.g., a list of one or more keywords), processing logic may generate a query in SQL based on the user search query and send the query generated to the database. When the database returns the result of the query, processing logic reports the result to the user (processing block 132).

Figure 2:
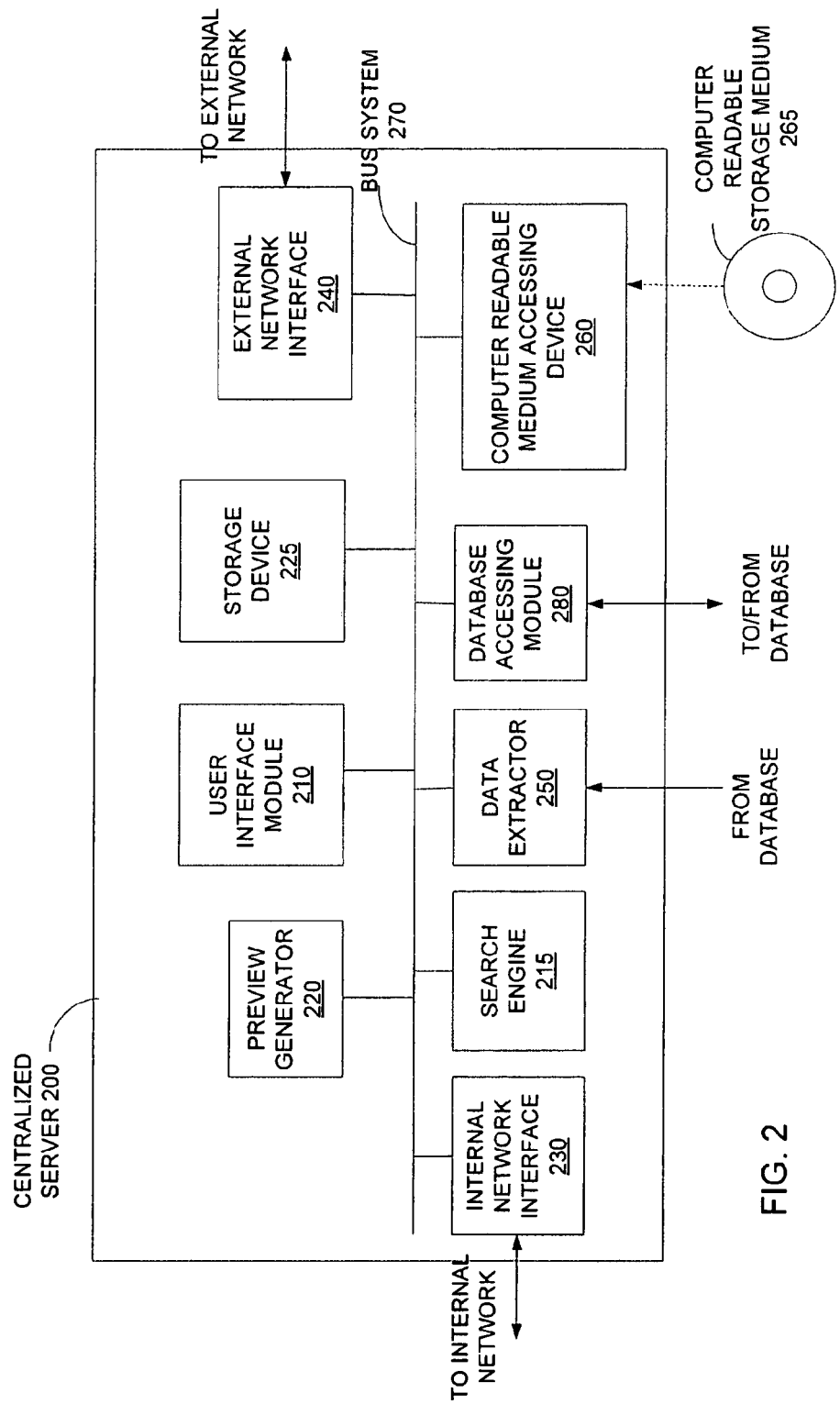
FIG. 2 illustrates a functional block diagram of one embodiment of a centralized server.

FIG. 2 illustrates a functional block diagram of one embodiment of a centralized server usable in a networked system in some embodiments. One embodiment of the networked system is discussed in detail below with reference to FIG. 3. Referring to FIG. 2, the centralized server 200 includes a user interface module 210, a search engine 215, a preview generator 220, a storage device 225, an internal network interface 230, an external network interface 240, a data extractor 250, a computer-readable medium accessing device 260, and a database accessing module 280, which are coupled to each other via a bus system 270.

In some embodiments, the centralized server 200 is communicably coupled to an internal network of a customer of a software vendor via the internal network interface 230. The internal network further includes one or more physical computing machines of the customer, such as servers, workstations, desktop personal computers (PCs), laptops, mobile devices (e.g., personal digital assistants, cellular telephones, etc.), etc. The centralized server 200 is further coupled to an external network, such as the Internet, via the external network interface 240. The external network interface 240 may establish a secured connection to access an external server provided by the software vendor (such as the external server 370 in FIG. 3) to retrieve various contents from the external server, such as metadata of an operating system, information on provisioning virtual hosts and virtual guests, application upgrades, etc. These contents retrieved may be stored or cached locally in the storage device 225 or on a storage device (e.g., a database) coupled to the centralized server 200 within the internal network.

Alternatively, the centralized server 200 may obtain the contents from the external server via a portable computer-readable storage medium 265 removably coupled to the computer-readable medium accessing device 260. Some examples of the computer-readable storage medium 265 and computer-readable storage medium accessing device 260 include a CD and a CD-ROM drive, a flash memory card with a Universal Serial Bus (USB) connector and a USB drive, etc. The external server of the software vendor may store the contents onto the computer-readable storage medium 265, which is then delivered to the customer for the centralized server's 200 use.

In some embodiments, the centralized server 200 is further coupled to a database within the internal network via the database accessing module 280 and the data extractor 250. The database stores various information of the networked system, and some of which is critical to the networked system. To improve the accessibility of the critical information, the data extractor 250 may extract a subset of data relevant to the critical information from the database. In addition to, or in alternative to, critical information, the data extractor 250 may extract data frequently accessed by users from the database. Then the search engine 215 may go through the subset of data extracted to generate an index. For example, if the subset of data includes a document (e.g., a user manual), then the search engine 215 may crawl the document to identify links within the document and then index the links. One example of the search engine 215 is Nutch provided by Apache Software Foundation. Other embodiments of the centralized server 200 may use a different search engine. The index generated may be stored locally in the storage device 225. Using the index, the preview generator 220 may generate a preview of the subset of data for users. The preview generator 220 may present the preview on a display device. Alternatively, the preview generator 220 may put the preview into a file inside a predetermined directory for users to access later.

In some embodiments, the user interface module 210 generates a user interface (e.g., a graphical user interface, a text user interface, a command line interface, etc.) to allow users to enter a user search query directed to data in the database. When the centralized server 200 receives the user search query, the search engine 215 may go through the index in the storage device 225 first to find any matching data. If there is matching data, then the user interface module 210 may generate another user interface to report the matching data to the users. As a result, the response time to the user search query is shorten because the search engine 215 searches the index stored locally in the storage device 225, instead of accessing the database external to the centralized server 200. Otherwise, if there is no matching data in the index, then the database accessing module 280 may query the database to determine if there is any matching data in the database. In some embodiments, the database accessing module 280 may generate a query in a format or language recognizable by the database (e.g., SQL) based on the user search query and send the query to the database. Alternatively, the database accessing module 280 may simply forward the user search query to the database if the user search query is already in a format recognizable by the database.

Figure 3:
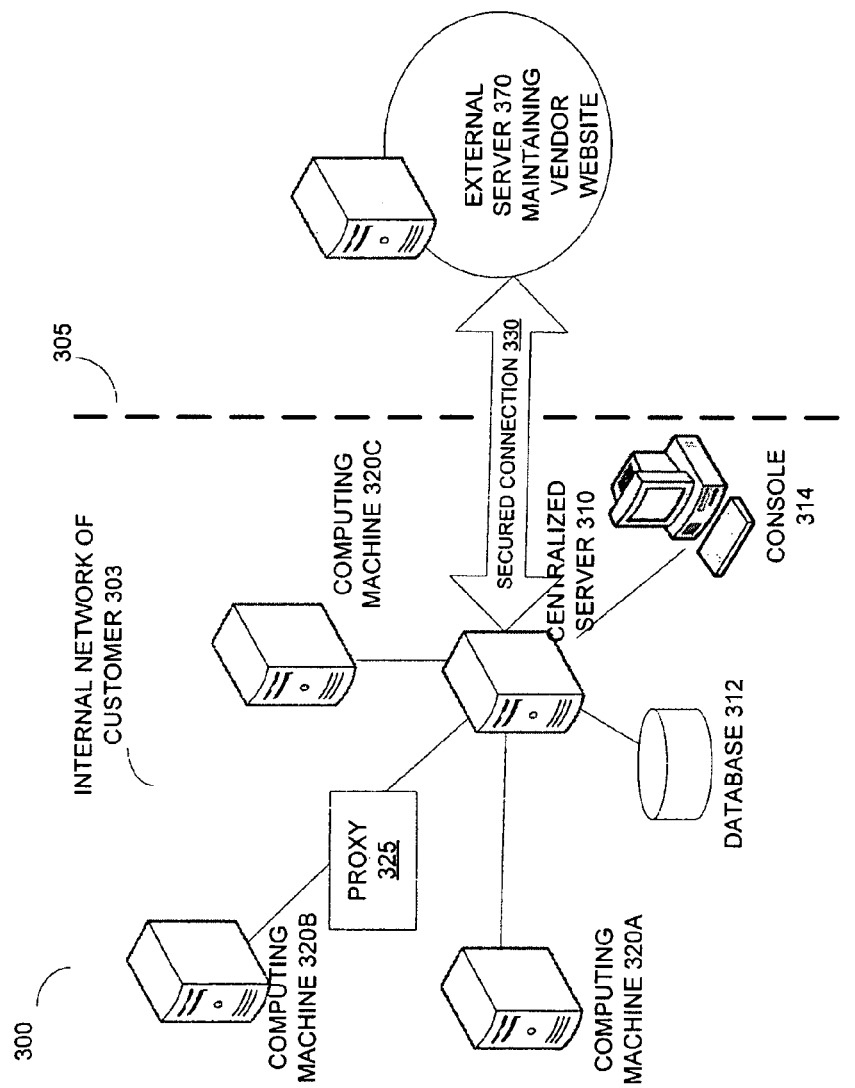
FIG. 3 illustrates one embodiment of a system in which embodiments of the present invention may be implemented.

FIG. 3 illustrates one embodiment of a system in which embodiments of the present invention may be implemented. The system 300 includes an external server 370 maintained by a software vendor and an internal network 303 of a customer of the software vendor, coupled to each other via a secured connection 330, such as a virtual private network (VPN) over a public network (e.g., the Internet). Thus, the system 300 may be referred to as a connected setup. Alternatively, the external server 370 and the internal network 303 may not be communicably coupled to each other. Rather, data and information may be loaded onto portable computer-readable storage media, such as compact discs (CDs), digital video disks (DVDs), flash memory cards with USB connectors, etc. The portable computer-readable storage media is then delivered to the customer's site to be loaded onto a centralized server within the internal network. As such, this system may be referred to as a disconnected setup.

In some embodiments, the internal network 303 of the customer further includes components shown on the left side of the dotted line 305. As illustrated in FIG. 3, the internal network 303 of the customer includes a centralized server 310, a number of computing machines 320A-320C, a database 312, and a console 314. The computing machines 320A-320C are physical hardware, such as servers, workstations, desktop personal computers (PCs), laptops, etc. The computing machines 320A-320C, the console 314, and the database 312 are coupled to the centralized server 310 within the internal network 303. In some embodiments, one or more of the customer's computing machines may be coupled to the centralized server 310 via a proxy, such as the proxy 325 between the computing machine 320B and the centralized server 310. The proxy 325 may cache software packages to enhance performance, speed up downloads, and offload some of the operations from the centralized server 310.

In some embodiments, the centralized server 310 extracts a subset of data relevant to some critical information from the database 312. The centralized server 310 further indexes the subset of data to generate an index. The index is stored locally on the centralized server 310 so that the centralized server 310 may provide a preview of the subset of data to users without accessing the database 312. Furthermore, the centralized server 310 may respond more quickly to user search queries if data matching the user search queries is available in the index. Details of one embodiment of the centralized server 310 and one embodiment of the method to extract and to index data from the database 312 have been described above.

Referring back to FIG. 3, the internal network 303 includes a local area network (LAN) protected from unauthorized access. For instance, a firewall may be employed at a gateway or proxy of the LAN to prevent unauthorized access to the LAN. Through the secured connection 330, the centralized server 310 within the internal network 303 may access the external server 370 external to the internal network 303. For example, the external server 370 may host a website of the software vendor and the centralized server 310 may establish the secured connection 330 to the website using one or more Internet security protocol (e.g., secure socket layer (SSL), secure shell (SSH), transport layer security (TLS), etc.). Thus, the centralized server 310 may securely retrieve or download various contents from the external server 370, such as contents that are available only by purchase and/or license (e.g., metadata of an operating system, such as Red Hat Enterprise Linux provided by Red Hat, Inc. of Raleigh, N.C., information on provisioning, executables of client applications, etc.). The contents retrieved are stored locally within the customer's internal network 303. In one embodiment, the contents retrieved are stored in a storage device internal to the centralized server 310. Alternatively, the contents retrieved may be stored in the database 312 coupled to the centralized server 310 within the internal network 303. Alternatively, the contents retrieved may be stored in a Network-Attached Storage (NAS) device. After downloading the contents from the external server 370, the centralized server 310 may terminate the secure connection 330 such that no talk back to the external server 370 is allowed. As such, the above approach allows the customer to take the customer's system off the external network (e.g., the Internet), and hence, providing more optimization, flexibility, and control of the system to the customer.

The centralized server 310 may synchronize with the external server 370 by checking with the external server 370 for updates and/or changes to the contents retrieved previously. Such synchronization may be performed periodically and/or in response to user requests. Alternatively, the external server 370 may notify the centralized server 310 when there are changes and/or updates to the contents previously provided to the centralized server 310. When there is a change to an item previously retrieved, the centralized server 310 may retrieve the change from the external server 370 and then update a copy of the item on the centralized server 310 accordingly, or the centralized server 310 may simply retrieve an updated version of the item to replace the previously retrieved version. In some embodiments, synchronization is performed via one or more channels within the secured connection 330 between the centralized server 310 and the external server 370. A channel as used herein refers to a collection of software packages organized into a logical grouping. For example, the set of packages that make up an operating system is organized into a channel in some embodiments. Different types of contents may be associated with different channels such that the centralized server 310 may choose to synchronize a subset of the channels as needed. For example, information related to provisioning virtual hosts and virtual guests may be associated with a Tool channel.

Alternatively, the centralized server 310 may synchronize with the external server 370 via portable computer-readable storage media, such as CDs, DVDs, flash memory cards with USB connectors, etc. When there is a change to content previously provided to the centralized server 310, the change to the content or an updated version of the content may be stored onto the computer-readable storage media from the external server 370. Then the computer-readable storage media may be delivered to the customer, who would provide the computer-readable storage media to the centralized server 310. By providing the computer-readable storage media to the centralized server 310, the centralized server 310 obtains the updated content, such as the metadata and information, from the computer-readable storage media and subsequently, uses the updated content to manage the computing machines 320A-320C as well as the virtual hosts and virtual guests provisioned on the computing machines 320A-320C.

Figure 4:
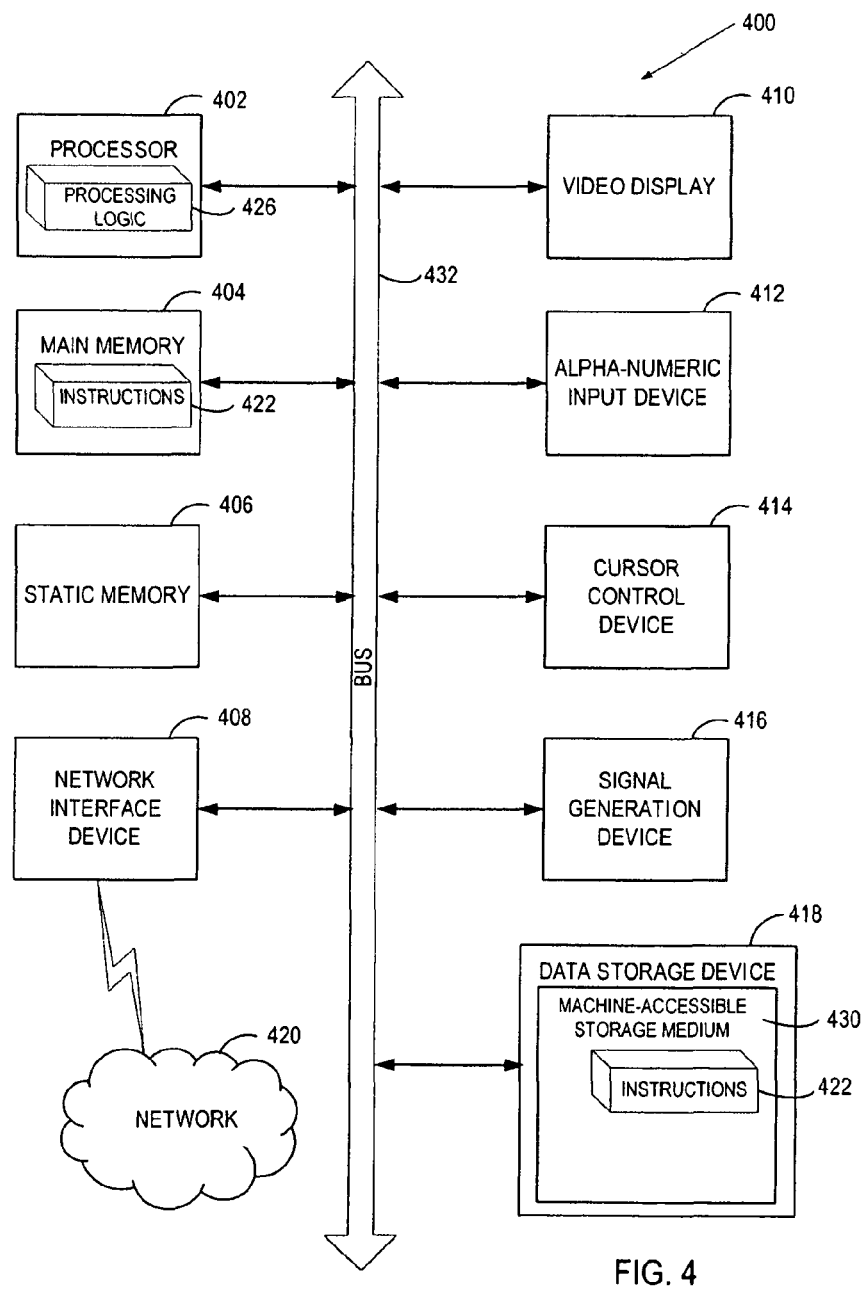
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 432.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium or a computer-readable medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of extracting and indexing data from a database in a networked system have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   determining a subset of data stored in a database external to a networked system to index;
   extracting, by a processing device in the networked system, the subset of data from the database;
   indexing, by the processing device, the subset of data extracted to generate an index via a search engine;
   storing the index locally in a storage device internal to the networked system;
   intercepting a user search query to the database;
   searching the locally stored index without accessing the database via a preview generator in response to intercepting the user search query to find matching data;
   upon finding matching data in the locally stored index, providing, by the processing device, via the preview generator, a preview of the matching data on a display device in view of the locally stored index;
   upon finding no matching data in the locally stored index, searching, by the processing device, the database via a database accessing module in view of the user search query to find matching data;
   receiving, from a server external to the networked system, a notification of updates to the subset of data in the database, wherein the subset of data comprises a document crawled to generate a list of links;
retrieving, using the processing device, the updates from the database in response to receiving the notification; and
updating the index in view of the updates to the subset of information.

2. The method of claim 1, wherein the preview comprises matching data to the user search query.

3. The method of claim 1, wherein the index comprises a keyword-based index.

4. The method of claim 1, comprising:
indexing the list of links.

5. The method of claim 1, further comprising:
storing the index on a centralized server coupled to the database in the networked system.

6. The method of claim 1, further comprising:
generating a user interface to receive the user search query.

7. An apparatus comprising:
a first storage device to store instructions; and
a processing device, operatively coupled to the first storage device, to retrieve and execute the instructions to:
implement a data extractor to determine a subset of data stored in a database external to a networked system to index, and to extract a subset of data from the database external to the networked system,
implement a search engine to index the subset of data extracted to generate an index and to store the index locally in a second storage device internal to the networked system,
implement a preview generator to intercept a user search query to the database, search the locally stored index without accessing the database in response to intercepting the user search query to find matching data, and upon finding matching data, generate a preview of the matching data on a display device in view of searching the locally stored index,
upon not finding matching data in the locally stored index, implement a database accessing module to search the database in view of the user search query of the database to find matching data,
receive, from a server external to the networked system, a notification of updates to the subset of data in the database, wherein the subset of data comprises a document crawled to generate a list of links,
retrieve the updates from the database in response to receiving the notification, and
update the index in view of the updates to the subset of information.

8. The apparatus of claim 7, wherein the index comprises a keyword-based index.

9. The apparatus of claim 7, wherein the search engine is to index the list of links.

10. The apparatus of claim 7, wherein the processing device further implements a user interface module to generate a user interface to receive the user search query.

11. A system comprising the apparatus of claim 7, further comprising:
a centralized server coupled to the database, wherein the data extractor, the preview generator, and the search engine are implemented on the centralized server.

12. The system of claim 11, further comprising a plurality of computing machines coupled to the centralized server, wherein the centralized server manages the plurality of computing machines.

13. A non-transitory computer-readable medium embodying instructions that, when executed by a processing device, cause the processing device to:
determine a subset of data stored in a database external to a networked system to index;
extract, by the processing device, the subset of data from the database external to a networked system;
index, by the processing device, the subset of data extracted to generate an index via a search engine;
intercept a user search query to the database;
store the index in a storage device internal to the networked system;
search the locally stored index without accessing the database via a preview generator in response to intercepting the user search query to find matching data;
upon finding matching data in the locally stored index, provide a preview of the subset of data on a display device in view of searching the index via the preview generator;
upon not finding matching data in the locally stored index, search, by the processing device, the database via a database accessing module in view of the user search query of the database to find matching data;
receive, from a server external to the networked system, a notification of updates to the subset of data in the database, wherein the subset of data comprises a document crawled to generate a list of links;
retrieve, using the processing device, the updates from the database in response to receiving the notification; and
update the index in view of the updates to the subset of data.

14. The non-transitory computer-readable medium of claim 13, wherein the index comprises a keyword-based index.

15. The non-transitory computer-readable medium of claim 13, wherein the processing device is further to:
index the list of links.

16. The non-transitory computer-readable medium of claim 13, the processing device further to:
store the index on a centralized server coupled to the database in the networked system.

17. The non-transitory computer-readable medium of claim 13, the processing device further to:
generate a user interface to receive the user search query.

* * * * *